(12) United States Patent
Ciccone et al.

(10) Patent No.: US 7,570,725 B1
(45) Date of Patent: Aug. 4, 2009

(54) NUMERICALLY CONTROLLED OSCILLATOR

(75) Inventors: John Ciccone, Scottsdale, AZ (US); Richard Taylor, Phoenix, AZ (US); Thomas W. Ciccone, Tempe, AZ (US)

(73) Assignee: Marvell International Ltd., Hamilton (BM)

( * ) Notice: Subject to any disclaimer, the term of this patent is extended or adjusted under 35 U.S.C. 154(b) by 535 days.

(21) Appl. No.: 11/369,778

(22) Filed: Mar. 7, 2006

(51) Int. Cl.
*H04L 7/00* (2006.01)
(52) U.S. Cl. ...................................... 375/371
(58) Field of Classification Search ................ 375/371, 375/373, 375; 331/182–183
See application file for complete search history.

(56) References Cited

U.S. PATENT DOCUMENTS 5,887,040 A * 3/1999 Jung et al. ................... 375/372
6,363,129 B1 * 3/2002 Agazzi ........................ 375/355
7,221,727 B2 * 5/2007 Co .............................. 375/376

* cited by examiner

*Primary Examiner*—Khanh C Tran

(57) ABSTRACT

A numerically controlled oscillator (NCO) is arranged to accumulate control values for each transition of a system clock to provide an accumulation signal and an edge signal. A speed multiplier value (N) is selected to simulate a desired clock resolution of N times the system clock resolution. The multi-phase predictive clock circuit is arranged to provide clock phase output signals that each correspond to a predicted clock phase as if the system clock where running at N times faster than the actual system clock. The edge detector circuit is arranged to compare values of adjacent clock phases to identify a transition in one of the clock phases. The phase encoder circuit is arranged to provide a phase signal that indicates a transition in one clock phase. The edge signal and the phase signal can be used for careful phase alignment control at effectively higher resolution.

20 Claims, 4 Drawing Sheets

NUMERICALLY CONTROLLED OSCILLATOR

FIELD OF THE INVENTION

The present invention generally relates to oscillator circuits. More particularly, the present invention relates to a numerically controlled oscillator circuit that has a predictive multiphase clock generator that is arranged to increase output clock phase resolution.

BACKGROUND

Oscillators are useful system components in digital and analog systems that require clock signals. A digital oscillator can be used to generate a clock signal with an accumulating register arrangement. At a predetermined clock rate, a value stored in a register of the digital oscillator is increased in value by a control value that is successively applied to an input of the digital oscillator. The digital oscillator periodically overflows, but continues to accumulate over successive iterations of the accumulation of the control value. The average rate of the overflow of the digital oscillator is dependent upon the control value selected and the bit resolution of the register in the digital oscillator.

In one example, the most significant bit of a 4-bit register in the digital oscillator is representative of the output clock signal. The 4-bit register can accommodate storing values in the range from 0 through 15 in binary increments. The most significant bit of the register corresponds to logic 0 for register values between 0 and 7, and logic 1 for register values that are between 8 and 15. The period of the output clock signal is determined by the control values. For a control value of 2, the digital oscillator will accumulate values corresponding to 0, 2, 4, 6, 8, 10, 12, and 14 followed by an attempt to accumulate a value of 16. Since the value of 16 exceeds the capabilities of the 4-bit register, the 4-bit register will overflow to zero. For the above-described sequence, the most significant bit of the register has a duty cycle of exactly 50% with a frequency that is exactly half of the frequency of the input system clock signal.

In another 4-bit register example, a control value of 3 is applied to the digital oscillator so that, the digital oscillator will accumulate values corresponding to 0, 3, 6, 9, 12 and 15 followed by an attempt to accumulate a value of 18. Since the value of 18 exceeds the capabilities of the 4-bit register, the 4-bit register will overflow to a value of 2. The accumulation continues as: 2, 5, 8, 11, 14 and an attempt to accumulate a value of 17, resulting in an overflow to a value of 1. Accumulation again continues as: 1, 4, 7, 10, and 13, with an attempt to accumulate a value of 16, which overflows to a value of 0. The complete repeating sequence of accumulations is thus given as: 0, 3, 6, 9, 12, 15, 2, 5, 8, 11, 14, 1, 4, 7, 10 and 13 and therefore covers all sixteen possible states of the four bit register. The most significant bit for this repeating sequence corresponds to: 0, 0, 0, 1, 1, 1, 0, 0, 1, 1, 1, 0, 0, 0, 1, 1, etc. For the above-described sequence, the most significant bit of the register is logic 0 exactly 50% of the time and the frequency of the output clock signal is on average one third of the frequency of the input system clock.

BRIEF DESCRIPTION OF THE DRAWINGS

Non-limiting and non-exhaustive embodiments are described with reference to the following drawings.

DETAILED DESCRIPTION OF THE PREFERRED EMBODIMENT

Figure 1:
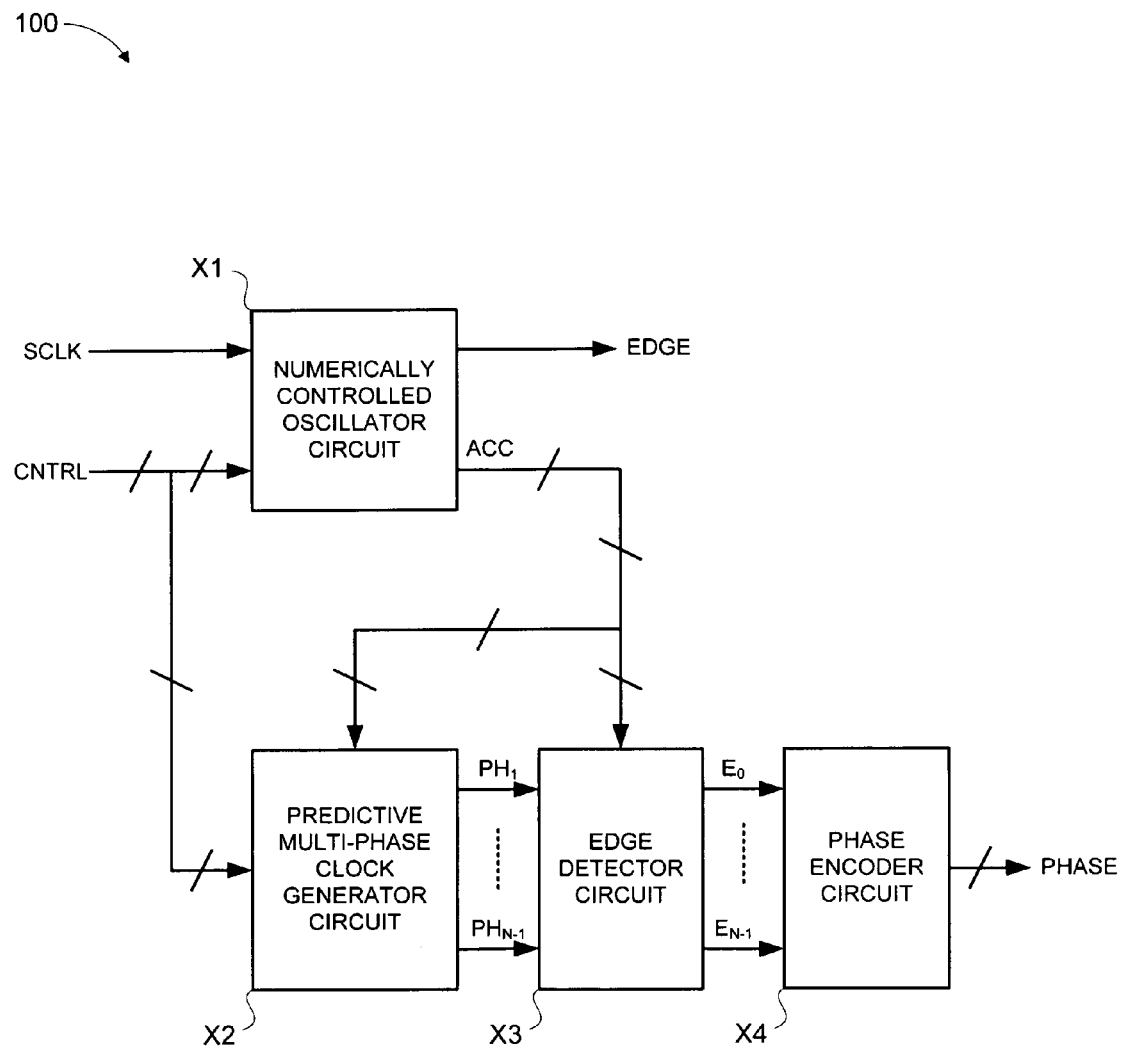
FIG. 1 is a block diagram of a numerically controlled oscillator system that is arranged in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, a numerically controlled oscillator (NCO) can be arranged to cooperate with a multi-phase predictive clock circuit, an edge detector circuit, and a phase encoder circuit. The numerically controlled oscillator (NCO) can be arranged to accumulate control values for each transition of a system clock to provide an accumulation signal and an edge signal. A speed multiplier value (N) is selected to simulate a desired clock resolution of N times the system clock resolution. The multi-phase predictive clock circuit is arranged to provide clock phase output signals that each correspond to a predicted clock phase as if the system clock where running at N times faster than the actual system clock. The edge detector circuit is arranged to compare values of adjacent clock phases to identify a transition in one of the clock phases. The phase encoder circuit is arranged to provide a phase signal that indicates a transition in one clock phase. The edge signal and the phase signal can be used for careful phase alignment control at effectively higher resolution.

FIG. 1 is a block diagram of a numerically controlled oscillator system (100) that is arranged in accordance with the present disclosure. The block diagram illustrates a functional partitioning of circuits that includes: a numerically controlled oscillator (NCO) circuit (X1), a multi-phase predictive clock circuit (X2), an edge detector circuit (X3), and a phase encoder circuit (X4). Although the circuits are illustrated as functionally partitioned, the various functions can be combined and/or separated into other circuits that yield the same overall functionality without departing from the spirit of the present invention.

The numerically controlled oscillator (NCO) circuit (X1) is arranged to cooperate with the multi-phase predictive clock circuit (X2), the edge detector circuit (X3), and the phase encoder circuit (X4) to provide the overall desired functionality. NCO circuit X1 is arranged to: receive a system clock signal (SCLK) and a control value (CNTRL), and provide an edge signal (EDGE) and a phase signal (PHASE).

The numerically controlled oscillator (X1) is arranged to accumulate control values for each rising edge transition of the system clock signal (SCLK) to provide an accumulation signal (ACC) and an edge signal (EDGE). The edge signal (EDGE) indicates that a transition has occurred in a clock from the numerically controller oscillator (NCO), while the accumulation signal (ACC) indicates an accumulated numerical value associated with the output of the NCO. The control value (CNTRL) is a multi-bit digital code that can be used, for example, to program the NCO (X1) for a desired numerical oscillation frequency.

A speed multiplier value (N) is selected (e.g., via a register) to simulate a desired clock speed of N times the system clock speed. The multi-phase predictive clock circuit (X2) is responsive to the control value (CNTRL) and the accumulation signal (ACC) to provide clock output signals ($PH_1$ through $PH_{N-1}$) that are each indicative of a respective clock phase. Each of the clock phase output signals is a digital quantity that indicates a predicted numerical value that would have resulted in the numerical oscillator if the system clock where running at N times faster than the system clock (SCLK).

The edge detector circuit (X3) is arranged to compare values of adjacent clock phase output signals to identify an edge transition in one of the clock phases. Each adjacent pair of clock phase output signals is thus utilized to generate a respective edge detection signal. For example, a first edge detection signal ($E_0$) indicates a transition between clock phase output signals $PH_1$ and $PH_2$, while a second edge detection signal ($E_1$) indicates a transition between clock phase output signals $PH_2$ and $PH_3$.

The phase encoder circuit (X4) is responsive to the edge detection signals ($E_0$ through $E_{N-1}$), and arranged to provide a phase signal (PHASE) that indicates a transition in one of the clock phase. The edge signal and the phase signal can be used for careful phase alignment control at effectively higher resolution.

In an example implementation, the NCO (X1) includes a 4-bit register that is initialized with a control value of 3. For this example, the NCO (X1) is arranged to provide an accumulation signal (ACC) that has values that oscillate in the following repeating sequence: 0, 3, 6, 9, 12, 15, 2, 5, 8, 11, 14, 1, 4, 7, 10, and 13. The most significant bit (MSB) from the 4-bit register for this repeating sequence corresponds to another repeating sequence of: 0, 0, 0, 1, 1, 1, 0, 0, 1, 1, 1, 0, 0, 0, 1, and 1. The edge signal (EDGE) for this example can be asserted each time that the MSB toggles between a logic 0 and a logic 1, indicating that a rising edge transition has occurred. For the above described sequence, EDGE has a repeating sequence of: 0, 0, 0, 1, 0, 0, 0, 0, 1, 0, 0, 0, 0, 0, 1, and 0. For the above-described sequence, the most significant bit of the 4-bit register is logic 0 approximately 50% of the time, but the average frequency of the output clock signal is exactly 3/16 of the frequency of the system clock signal (SCLK). The above-described implementation is intended only to serve as an example that is not intended to limit the scope of this disclosure to 4-bit registers.

Figure 2:
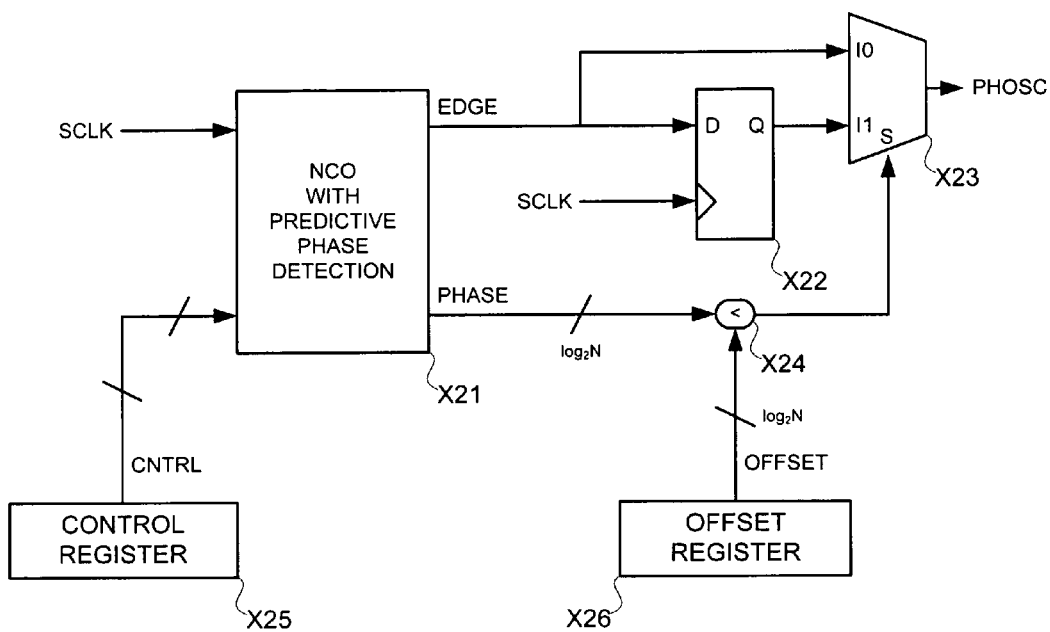
FIG. 2 is a schematic diagram of an example oscillator circuit that is arranged in accordance with the present disclosure.

FIG. 2 is a schematic diagram of an example oscillator circuit (200) that is arranged in accordance with the present disclosure. Oscillator circuit 200 includes an NCO circuit that includes predictive phase detection (X21), a d-type flip-flop circuit (X22), a multiplexer circuit (X23), a digital comparator circuit (X24), a control register circuit (X25), and an offset register circuit (X26).

The operational features of the NCO circuit (X21) of FIG. 2 are substantially similar to the NCO system (100) that was described previously with respect to FIG. 1. For example, NCO circuit X21 is arranged to: receive a system clock signal (SCLK) and a control value (CNTRL), and provide an edge signal (EDGE) and a phase signal (PHASE). The edge signal (EDGE) indicates that a transition has occurred in a clock from the numerically controller oscillator (NCO) circuit. The control value (CNTRL) is a multi-bit digital code that is provided by control register X25, which can be used to program a desired numerical oscillation frequency.

A speed multiplier value (N) is selected (e.g., via another register) to simulate a desired pseudo-clock speed of N times the system clock speed. The phase output signal (PHASE) is indicative of an encoded signal that has $\log_2 N$ bits of resolution. The encoded clock phase output signal (PHASE) is a digital quantity that indicates a value for a selected clock phase that has transitioned in the NCO circuit (X21), which is based on the predicted numerical value that would have resulted internal to the numerical oscillator if the system clock where running at N times faster than the system clock (SCLK).

The offset register circuit (X26) is arranged to store a value associated with an offset signal (OFFSET), which is also $\log_2 N$ bits of resolution. The offset signal (OFFSET) corresponds to a user programmable (or pre-programmed) an average phase offset associated with the system. The digital comparator circuit (X24) is arranged to provide a selection signal to a selector input of the multiplexer circuit (X23), based on a comparison between signals OFFSET and PHASE. When signal PHASE is less than OFFSET, a selection signal of a first-type (e.g., logic 1) is provided to the selector input of multiplexer circuit X23. When signal PHASE is greater than or equal to OFFSET, another selection signal of a second-type (e.g., logic 0) is provided to the selector input of multiplexer circuit X23.

The d-type flip-flop circuit (X22) is arranged to evaluate the edge detection signal (EDGE) on a rising edge transition in the system clock signal (SCLK). The Q output of the d-type flip-flop circuit (X22) thus indicates the last latched version of the signal EDGE. A first input of the multiplexer circuit (X23) is arranged to receive signal EDGE, while a second input of the multiplexer circuit (X23) is arranged to receive the Q output of the d-type flip-flop circuit (X22). As stated previously, the output of the digital comparator circuit (X24) is arranged to provide the selection signal that couples one of the first and second inputs of the multiplexer circuit (X23) to an output port as signal PHOSC. Signals EDGE and PHASE are effectively used together by the d-type flip-flop circuit (X22), multiplexer circuit (X23), and the digital comparator circuit (X24) to provide careful phase alignment of signal PHOSC at effectively higher resolutions than that for the system clock (SCLK) alone.

Figure 3:
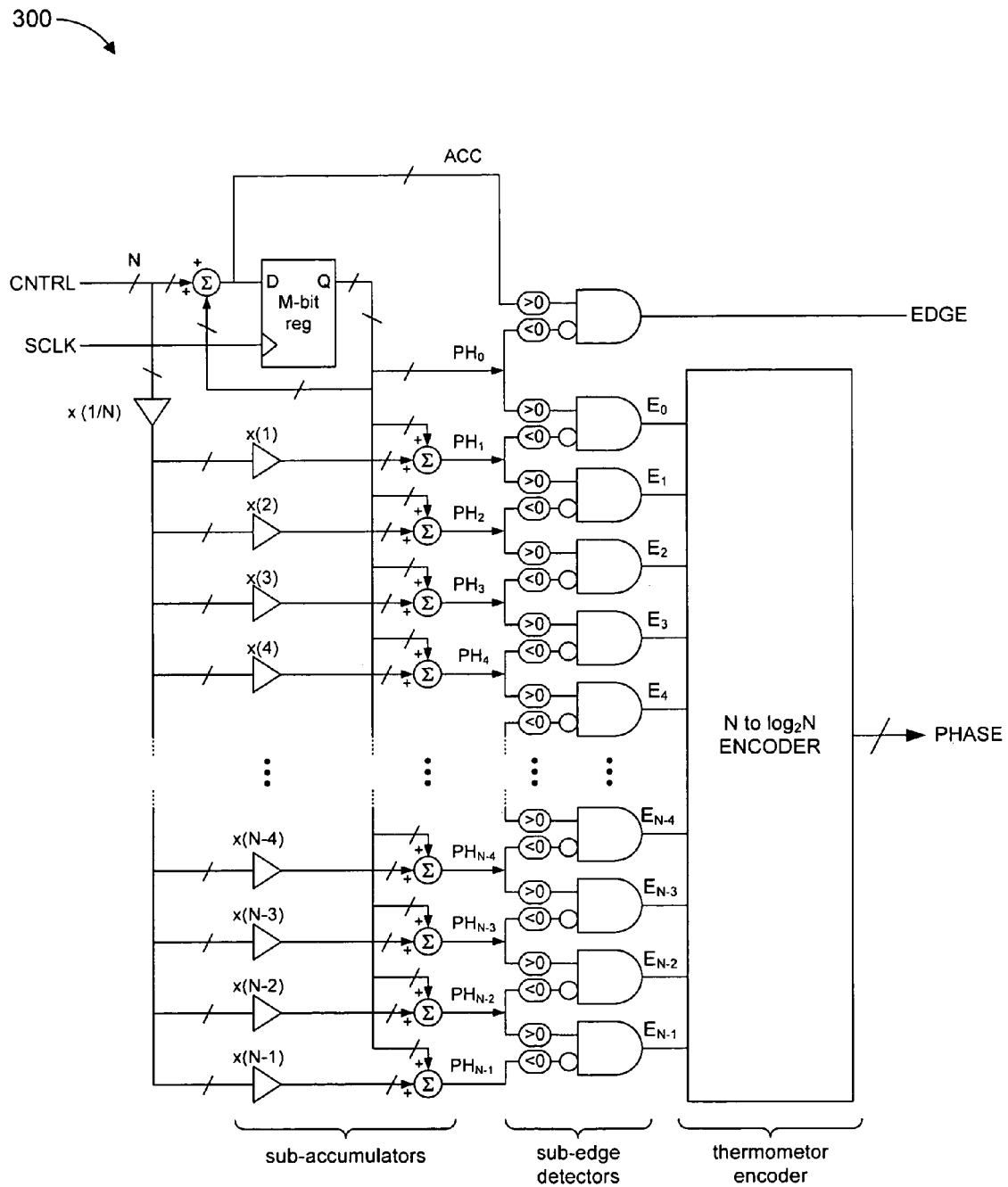
FIG. 3 is a detailed schematic diagram of a numerically controlled oscillator that is arranged in accordance with the present disclosure.

FIG. 3 is a detailed schematic diagram of a numerically controlled oscillator (300) that is arranged in accordance with the present disclosure. NCO 300 includes an M-bit register, a feedback summer circuit, a plurality (N−1) of sub-accumulator circuits, a multiplicity of sub-edge detector circuits, an edge transition detector circuit, and a thermometer encoder circuit.

The M-bit register and the feedback summer circuit are arranged to operate as an accumulator in the NCO. The feedback summer circuit is arranged to add successive values from the output of the M-bit register to the control value (CNTRL). The accumulated values from the output of the feedback summer circuit are latched into the D input of the M-bit register in response to a rising edge in the system clock signal (SCLK). The Q output of the M-bit register is arranged to provide a non-predictive NCO output signal, which corresponds to an accumulation signal that is substantially similar to signal ACC from FIG. 1.

The edge transition detector is illustrated as two digital comparator circuits and a logic circuit (illustrated as an AND circuit with an inversion on the second input). The output of the feedback summer circuit is coupled to the input of one digital comparator circuit, while the Q output of the M-bit register is coupled to the input of the other digital comparator circuit. The logic circuit is arranged to evaluate the output of the two digital comparator circuits and provide the signal EDGE in response thereto. The EDGE signal is asserted to indicate when one of the predictive clock phases is expected to transition, and de-asserted when none of the predictive clock phases are expected to transition. For example, when either the output of the feedback summer circuit has a value that is not greater than zero or the Q-output of the M-bit register has a value that is less than zero (e.g., a twos complement number is less than zero when the MSB is asserted and greater than zero when the MSB is de-asserted), the EDGE signal is de-asserted to indicate that no edge transition has occurred. Similarly, when the output of the feedback summer circuit has a value that is greater than zero and the Q-output of the M-bit register has a value that is no less than zero, the accumulated value is straddling an edge transition for one of the output clock phases and the EDGE signal is asserted.

The digital divider circuit is arranged to provide a divided control value that corresponds to CNTRL/N. Each sub-accumulator is arranged to accumulate its own sub-accumulation value from a combination of a gain scaled version of the divider control value and the accumulated output from the M-bit register. Each of the sub-accumulators has a different gain scaling factor relative to the divided control value. The first sub-accumulator has a gain scaling factor of 1. The second sub-accumulator has a gain scaling factor of 2, and so on, up to the N−1 sub-accumulator which has a gain scaling factor of N−1. Thus, the first sub-accumulator is arranged to accumulate values corresponding to ACC+(CNTRL/N), while the N−1 sub-accumulator is arranged to accumulate values corresponding to ACC+(CNTRL*{N−1}/N). The accumulated value associated with each respective sub-accumulator corresponds to a respective predicted clock phase (e.g., signals $PH_1$-$PH_{N-1}$ from FIG. 1) that is estimated from the accumulation signal (ACC) as if the system clock signal (SCLK) where oscillating at a frequency that was N-times faster than the actual system clock. The direct output of the register represents the zeroeth phase $PH_0$.

Each sub-edge detector circuit is arranged similar to the edge detector circuit in that they each include two digital comparators and a logic circuit. In one example, the first sub-edge detector circuit is arranged to identify a transition with a first edge detection signal ($E_0$) when an edge transition is found that straddles the accumulated value (ACC) from the Q output of the M-bit register and the first sub-accumulated value (e.g., $PH_1$=ACC+{CNTRL/N}) from the first sub-accumulator. For this example, the first edge detection signal ($E_0$) is asserted when signal ACC is greater than zero and signal $PH_1$ is not less than zero. Similarly, the N−1 sub-edge detector circuit is arranged to assert another edge detection signal ($E_{N-1}$) when the corresponding sub-accumulated value {e.g., $PH_{N-1}$=ACC+(CNTRL*[N−1]/N)} is not less than zero and the preceding sub-accumulated value (e.g., $PH_{N-2}$=ACC+(CNTRL*[N−2]/N)} is greater than zero. By comparing adjacent sub-accumulated values, the edge detection signals ($E_0$ through $E_{N-1}$) collectively provide an output that corresponds to a thermometer code. The thermometer encoder circuit receives all of the edge detection signals and provides an encoded signal (PHASE) that includes $log_2 N$ bits of resolution.

Figure 4:
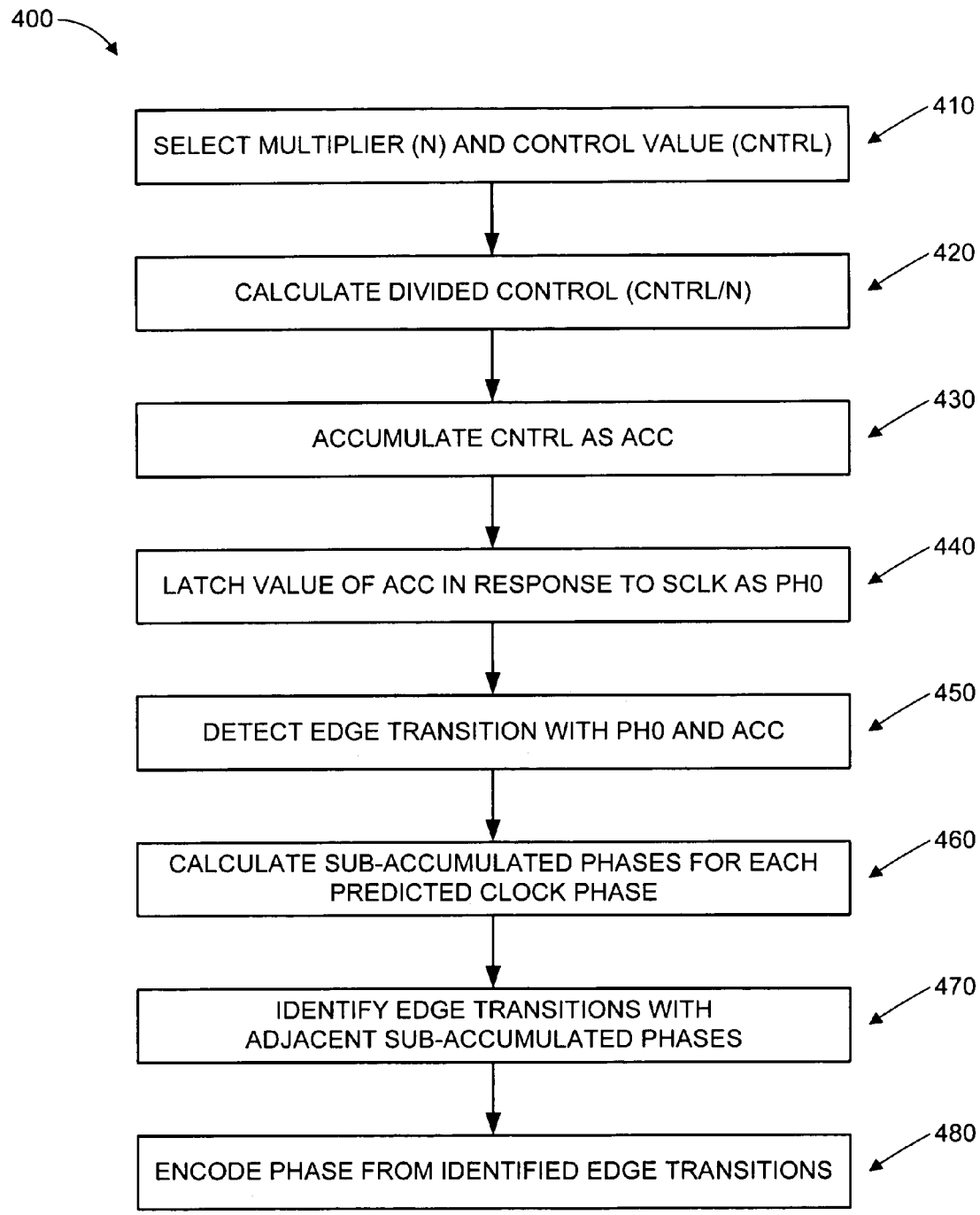
FIG. 4 is a detailed flow diagram of a numerically controlled oscillator that is arranged in accordance with the present disclosure.

FIG. 4 is a detailed flow diagram (400) of a numerically controlled oscillator that is arranged in accordance with the present disclosure. As will be appreciated by those in the art, the steps described below need not necessarily be performed in the presently described order. In many instances, the steps can be performed in a different sequential order, in parallel to one another, or in any other combination thereof.

At step 410, the multiplier and control values are selected as N and CNTRL, respectively. The multiplier value (N) corresponds to a desired clock frequency multiplication factor that is used to generate an effective speed multiplier for the oscillator relative to the input system clock signal (SCLK), as previously described. The control value (CNTRL) is used by the numerical oscillator for accumulation purposes as previously described. The values for the control and multiplier can be stored in one or more registers, user selected, pre-selected, etc.

At step 420, the divided control value is calculated from the multiplier and control values as CNTRL/N. The divided control value can be provided by a digital divider circuit as previously described.

At step 430, the control value (CNTRL) is arranged to provide an accumulated control value (ACC) by adding the current control value to a previously stored accumulated control value (ACC'). The accumulated control value is arranged to operate as part of a numerical oscillator that does not saturate at a single numerical value.

At step 440, the currently accumulated control value (ACC) is latched in response to a rising edge of the system clock (SCLK). The latched value from the currently accumulated control value becomes the stored accumulated control value (ACC') for the next period of the system clock (SCLK). Optionally, the stored accumulated control value (ACC') can be reset to zero or initialized to another desired value. The latched value also corresponds to the first clock phase (PHo) of the output clock.

At step 450, the values for $PH_0$ and ACC are evaluated to determine if an edge transition has occurred between them. Since signals $PH_0$ and ACC correspond to values of the accumulated control value that are separated in time by one clock period, an edge transition can be detected when the MSB between $PH_0$ and ACC are different from one another.

At step 460, sub-accumulated phases for each predictive clock phase are calculated. The sub-accumulated control value for each possible clock output phase is calculated using the divided control value, the stored accumulated control value (ACC' or $PH_0$) and a value x, where x is a value from 1 to N−1. A fractional control value is calculated from the divided control value as: $FCNT_x$=CNTRL*(x)/(N). The sub-accumulated control value ($PH_x$) for each of the possible phases are then determined as follows: PHx=$FCNT_x$+$PH_0$.

At step 470, each of the adjacent sub-accumulated control values are compared to one another to identify an edge transition between one predicted clock phase and another. For example, a first edge transition can be detected with signal $E_0$ when the MSB of $PH_0$ is different from the MSB of $PH_1$, while a second edge transition can be detected with signal E1 when the MSB of $PH_1$ is different from the MSB of $PH_2$.

At step 480, the identified edge transition signals are collectively evaluated and the predicted output clock phase can be identified and encoded in an output phase signal (PHASE). Since a transition will occur at the boundary of two adjacent values, the edge detection signals will provide a thermometer type of code. In other words the edge detection signals for all predicted output clock phases on one side of the transition boundary will have an MSB with a first value (e.g., logic 1), and the edge detection signals for all predicted output clock phases on the other side of the transition boundary will have an MSB with a second value (e.g., logic 0) that is different from the first value.

The above described systems, schematics and flow charts can be utilized to provide a clock signal that has a resolution that is significantly finer than that of the original system clock (SCLK). In one example, the system clock is operating at a frequency of 200 MHz, which typically has a resolution of approximately 5 nS. Utilizing the described topology and methods an output clock resolution can be achieved on the order of 1 nS.

In one example, the system clock operates at 200 MHz with a natural resolution of 5 nS. Using conventional methods we would run the internal clocking system at a frequency of 1 GHz (e.g., with a PLL system) to achieve ins resolution. Instead, a control value of five is selected (CNTRL=5) for the NCO with the system clock running at 200 MHz, and we accumulate with the NCO at a rate that is five times faster than a value of one. The above described system is further arranged to generate multiple predicted output clock phases. The first output clock phase is determined by adding one to the output of the NCO, while the second output clock phase is determined in part by adding two to the output of the NCO, etc.

Each of the output clock phases are sub-accumulated with a control value that is divided from the original control value for the NCO, providing up to N output clock phases. For example, the control value of five for the NCO gives us five potential output clock phases. The first output clock phase is simply the output of the NCO, or $PH_0$. Each other output clock phase, numbered from one through four, is determined as: $PH_x=PH_0+x$, where x=1 to 4. Since the output clock phases are effectively "inbetween" each cycle of the system clock, they each are advanced by 1 nS relative to the 5 nS system clock. Once the multiple clock phases are predictively determined, the only thing left to determine is which clock phase transitions during any given system clock cycle. As described above, this can be simply achieved with the edge transition detectors and the thermometer decoder/encoder. The effective speed of the overall NCO system is equal to the product of the system clock and N.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus that is operated from a system clock to provide an output clock with a resolution that exceeds a resolution associated with the system clock, comprising:
    a numerically controlled oscillator circuit that is arranged to provide an accumulation signal that is determined by successive accumulation of a control value in response to an edge transition in the system clock, wherein the control value is greater than one;
    a predictive multi-phase clock generator circuit that is arranged to provide multiple clock phase signals, wherein each of the multiple clock phase signals is determined by sub-accumulation of a divided version of the control value according to a respective scaling factor, and wherein a resolution associated with each of the multiple clock phase signals corresponds to the resolution of the system clock divided by N, where N is a multiplication factor; and
    an edge detector circuit that is arranged to evaluate the multiple clock phase signals to provide edge detection signals, wherein the edge detection signals each identify an edge transition between two adjacent clock phases from multiple clock phases.

2. The apparatus of claim 1, further comprising: a phase encoder circuit that is arranged to evaluate all of the edge detection signals and provide an encoded phase signal that indicates that an edge transition has occurred in a particular one of the multiple clock phase signals.

3. The apparatus of claim 2, further comprising a flip-flop circuit and a multiplexer circuit, wherein the flip-flop circuit is arranged to latch one of the edge detection signals in response to a rising edge in the system clock signal, and wherein the multiplexer circuit is arranged to select another one of the edge detection signals and an output of the flip-flop circuit in response to the encoded phase signal.

4. The apparatus of claim 2, further comprising a flip-flop circuit, a multiplexer circuit, and a digital comparator circuit, wherein the flip-flop circuit is arranged to latch one of the edge detection signals in response to a rising edge in the system clock signal, and wherein the multiplexer circuit is arranged to select another one of the edge detection signals and an output of the flip-flop circuit in response to a selection signal, and wherein the digital comparator circuit is arranged to provide the selection signal in response to the encoded phase signal and an offset signal.

5. The apparatus of claim 4, wherein the encoded phase signal and the offset signal each include a number of bits of resolution that are determined as $\log_2 N$.

6. The apparatus of claim 4, wherein the offset signal is provided by an offset control register.

7. The apparatus of claim 1, wherein the control value is provided by a control register.

8. The apparatus of claim 1, wherein the numerically controlled oscillator circuit comprises: a feedback summer circuit and a multi-bit register, wherein the feedback summer circuit includes a first input that is arranged to receive the control value, a second input that is coupled to an output of the multi-bit register, and an output that is coupled to a data input terminal of the multi-bit register, wherein the multi-bit register is arranged to latch the output of the feedback summer circuit in response to the system clock.

9. The apparatus of claim 1, further comprising a digital divider circuit that is arranged to provide the divided version of the control value, wherein the divided version of the control value corresponds to the control value divided by N.

10. The apparatus of claim 1, the predictive multi-phase clock generator circuit comprising a multiplicity of sub-accumulators that are each responsive to the divided version of the control value, wherein each sub-accumulator includes a gain scaling circuit, wherein each gain scaling circuit is arranged to provide a fractional control value by multiplying the divided version of the control value by a respective gain scaling factor, wherein each gain scaling factor is different from one another such that gain scaling factors from 1 through N−1 are provided.

11. The apparatus of claim 10, wherein each sub-accumulator further comprises a summer circuit that is arranged to add a stored accumulation signal to a respective one of the fractional control values to provide a respective clock output phase signal.

12. The apparatus of claim 10, the edge detector circuit further comprising: a multiplicity of sub-edge detectors that are each arranged to evaluate the two adjacent clock phases from the multiplicity of sub-accumulators, wherein each sub-edge detector includes a first digital comparator circuit, a second digital comparator circuit, and a logic circuit, wherein the first digital comparator circuit is arranged to evaluate a first of the two adjacent clock phases, wherein the second digital comparator circuit is arranged to evaluate a second of the two adjacent clock phases, and wherein the logic circuit is arranged to evaluate an output of the first and second digital comparator circuits to provide one of the edge detection signals.

13. The apparatus of claim 12, wherein the logic circuit in each sub-edge detector includes an AND logic gate and an inverter.

14. The apparatus of claim 1, the numerically controlled oscillator circuit comprising another edge detector circuit that is arranged to compare the accumulation signal to a stored version of the accumulation signal, wherein the stored version of the accumulation signal corresponds to the accumulation signal from a previous cycle of the system clock.

15. The apparatus of claim 1, wherein the edge detector circuit is further arranged such that the edge detection signals each identify the edge transition between two adjacent clock phases from the multiple clock phases when a most significant bit from the two adjacent clock phases are different from one another.

16. An apparatus that is operated from a system clock to provide an output clock with a resolution that exceeds a resolution associated with the system clock, comprising:
a numerically controlled oscillator circuit that comprises a feedback summer means and a register means, wherein the feedback summer means is arranged to provide an accumulation value that is associated with a sum of a control value and a previous accumulation value, and wherein the register means is arranged to latch the accumulation value as the previous accumulation value in response to the system clock, wherein the control value is greater than one;
a predictive multi-phase clock generator circuit that comprises a multiplicity of sub-accumulator means, wherein each sub-accumulator means has a corresponding fractional version of the control value and is arranged to accumulate the previous accumulation value with the corresponding fractional version of the control value to provide a respective sub-accumulation value;
an edge detector circuit that comprises a plurality of sub-edge detector means, wherein each sub-edge detector means is arranged to compare two of the sub-accumulation values from adjacent clock phases from the predictive multi-phase clock generator circuit to identify edge transitions between the adjacent clock phases; and
a phase encoder means that is arranged to provide a clock phase signal by encoding the identified edge transitions between the adjacent clock phases from the edge detector circuit.

17. The apparatus of claim 16, wherein each sub-accumulator means is arranged to provide a sub-accumulated value that is given as $PH_x=PH_0+x$, wherein x is a value that ranges from one to the control value less one, and wherein $PH_0$ corresponds to the previous accumulation value, and wherein each sub-edge detector means is arranged to compare most significant bits of sub-accumulated values $PH_j$ and $PH_k$, where j and k are sequential numbers in a range of x.

18. The apparatus of claim 16, further comprising:
an edge detection means in the numerically controlled oscillator circuit that is arranged to assert an edge signal when the accumulation value is a positive number and the previous accumulation value is a negative number;
a flip-flop means that is arranged to latch the edge signal in response to the system clock;
a multiplexing means that is arranged to: select the edge signal as the output clock when the clock phase signal is less than a predetermined offset signal, and select the latched edge signal as the output clock when the clock phase signal is not less than the predetermined offset signal.

19. A method for generating an output clock from a system clock such that the output clock has a resolution that exceeds a resolution associated with the system clock, comprising:
selecting a control value corresponding to CNTRL;
accumulating the control value with an accumulator circuit to provide an accumulation value corresponding to $ACC=CNTRL+PH_0$, wherein $PH_0$ corresponds to a previous version of the accumulation value;
latching the accumulation value with a latch circuit in response to the system clock to provide the previous version of the accumulation value;
detecting the occurrence of an edge transition with an edge detection circuit in response to values associated with $PH_0$ and ACC such that an edge detection signal is asserted when the edge transition is detected;
calculating sub-accumulation values for each predicted clock phase, wherein each sub-accumulated value is given as: $PH_x=PH_0+x$, where x is a value that ranges from one to (CNTRL −1);
identifying edge transitions associated with adjacent sub-accumulated values; and
encoding a phase signal from the identified edge transitions with an encoder circuit such that the phase signal indicates that a selected one of the predicted clock phases has transitioned when the edge detection signal is asserted.

20. The method of claim 19, further comprising:
latching the edge detection signal in a flip-flop in response to the system clock;
selecting the edge detection signal as the output clock when the phase signal is less than a predetermined offset signal; and
selecting an output of the flip-flop as the output clock when the phase signal is not less than the predetermined offset signal.

* * * * *